United States Patent
Wu et al.

(10) Patent No.: US 8,817,425 B1
(45) Date of Patent: Aug. 26, 2014

(54) DUAL-PIECE HEAT SINK LAYER FOR ROBUST READER IN MAGNETIC RECORDING HEAD

(71) Applicant: Headway Technologies, Inc., Milpitas, CA (US)

(72) Inventors: Yan Wu, Cupertino, CA (US); Kowang Liu, Fremont, CA (US); Glen Garfunkel, San Jose, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/835,966

(22) Filed: Mar. 15, 2013

(51) Int. Cl.
*G11B 5/33* (2006.01)
*G11B 11/00* (2006.01)
*G11B 5/147* (2006.01)

(52) U.S. Cl.
CPC ........................................ *G11B 5/147* (2013.01)
USPC ................... 360/319; 360/125.32; 360/320

(58) Field of Classification Search
CPC ........... G11B 2005/0021; G11B 5/314; G11B 5/6088; G11B 5/1278; G11B 2005/001; G11B 13/04; G11B 5/3133
USPC .......................... 360/319, 320, 125.32, 125.75
See application file for complete search history.

(56) References Cited

U.S. PATENT DOCUMENTS

| | | | |
|---|---|---|---|
| 5,644,455 A * | 7/1997 | Schultz | 360/320 |
| 6,181,514 B1 * | 1/2001 | Santini et al. | 360/125.55 |
| 6,381,094 B1 * | 4/2002 | Gill | 360/125.3 |
| 6,396,660 B1 * | 5/2002 | Jensen et al. | 360/125.75 |
| 6,452,761 B1 * | 9/2002 | Carey et al. | 360/320 |
| 6,700,752 B2 * | 3/2004 | Dimitrov et al. | 360/317 |
| 6,859,343 B1 * | 2/2005 | Alfoqaha et al. | 360/125.72 |
| 6,952,326 B2 * | 10/2005 | Hsu et al. | 360/125.43 |
| 7,170,713 B2 | 1/2007 | Gider et al. | |
| 7,209,329 B2 * | 4/2007 | Gill et al. | 360/324.2 |
| 7,212,367 B2 | 5/2007 | Clinton et | |
| 7,320,168 B2 * | 1/2008 | Han et al. | 29/603.13 |
| 7,623,322 B2 * | 11/2009 | Umehara et al. | 360/317 |
| 7,649,713 B2 * | 1/2010 | Ota et al. | 360/125.32 |
| 8,248,894 B2 * | 8/2012 | Sasaki et al. | 369/13.33 |
| 8,264,920 B1 * | 9/2012 | Chou et al. | 369/13.33 |
| 8,456,968 B1 * | 6/2013 | Sasaki et al. | 369/13.33 |

(Continued)

OTHER PUBLICATIONS

"The Reproduction of Magnetically Recorded Signals," by R. L. Wallace, Jr., The Bell System Technical Journal, Jul. 9, 1951, pp. 1145-1173.

*Primary Examiner* — Brian Miller
(74) *Attorney, Agent, or Firm* — Saile Ackerman LLC; Stephen B. Ackerman

(57) ABSTRACT

A read head structure is disclosed with a dual piece heat sink layer having a front piece formed over a front portion of a dynamic flying height (DFH) element and a back piece above a back portion of the DFH element. A first (S1) shield is formed on the front piece and between the front piece and air bearing surface (ABS). Front and back pieces are separated by an insulator gap. The front piece is used to help control read gap protrusion. As a result, a bottom portion of the S1 shield protrudes to a greater extent than a top portion adjacent to the sensor thereby protecting the sensor from unwanted contact with the magnetic media. The dual piece heat sink layer also enables an improved Figure of Merit in terms of temperature rise in the reader per unit of actuation (nm) delivered by the DFH element.

28 Claims, 4 Drawing Sheets

(56) References Cited

U.S. PATENT DOCUMENTS

| | | | |
|---|---|---|---|
| 2002/0154451 A1* | 10/2002 | Dimitrov et al. | 360/317 |
| 2003/0048578 A1* | 3/2003 | Kikuchi et al. | 360/123 |
| 2003/0067717 A1* | 4/2003 | Garfunkel et al. | 360/234.5 |
| 2004/0070870 A1* | 4/2004 | Hsiao et al. | 360/126 |
| 2004/0240327 A1* | 12/2004 | Sendur et al. | 369/13.35 |
| 2005/0094319 A1* | 5/2005 | Han et al. | 360/319 |
| 2005/0190495 A1* | 9/2005 | Lille | 360/128 |
| 2009/0251828 A1* | 10/2009 | Schreck et al. | 360/319 |
| 2010/0309581 A1 | 12/2010 | Wu et al. | |

* cited by examiner

DUAL-PIECE HEAT SINK LAYER FOR ROBUST READER IN MAGNETIC RECORDING HEAD

RELATED PATENT APPLICATION

This application is related to the following: Ser. No. 12/455,758, filing date Jun. 5, 2009; assigned to a common assignee, and herein incorporated by reference in its entirety.

TECHNICAL FIELD

The present disclosure relates to the insertion of two heat sink (HS) layers in an insulation layer in a read head structure wherein a front end HS layer is formed above a Dynamic Fly Heater (DFH) and below the bottom read shield (S1) while a back end HS layer is formed along the same plane as the front end HS layer, and together the two HS layers provide greater reader protrusion at the air bearing surface (ABS) without increasing DFH power usage.

BACKGROUND

Perpendicular recording has been developed in part to achieve higher recording density than is realized with longitudinal recording devices. A PMR write head typically has a main pole layer with a small surface area at an ABS, and coils that conduct a current and generate a magnetic flux in the main pole that exits through a write pole tip and enters a magnetic media (disk) adjacent to the ABS. The flux is used to write a selected number of bits in the magnetic media and typically returns through a shield structure to a back gap region of the write head which connects the main pole with the return shield. The return shield may also serve as the top shield in a read head formed below the write head in a combined read-write structure.

Perpendicular magnetic recording has become the mainstream technology for disk drive applications beyond 150 Gbit/in$^2$. The demand for improved performance drives the need for a higher areal density which in turn calls for a continuous reduction in transducer size. A PMR head which combines the features of a single pole writer and a double layered media (magnetic disk) has a great advantage over LMR in providing higher write field, better read back signal, and potentially much higher areal density. Current magnetic heads generally consist of a writer and a reader that are formed adjacent to one another along an ABS. The read head may be based on a TMR element in which a tunnel barrier layer separates two ferromagnetic (FM) layers where a first FM layer has a fixed magnetization direction and the second FM layer has a magnetic moment that is free to rotate about a direction orthogonal to the direction of the magnetic moment in the reference "fixed" layer. The resistance across the barrier changes as the free layer moment is rotated. This signal is used to detect the small magnetic field from the recorded magnetization pattern on the media.

Reducing the magnetic spacing from read/write heads to the magnetic media during both writing and reading is the most important factor in achieving better performance in high density recording. The writer and reader are separated by several microns in a typical recording head and are made of several different materials each having a unique coefficient of thermal expansion (CTE). Therefore, the protrusion of the reader and writer are usually quite different due to the effect of varying operating temperatures, applying dynamic flying height (DFH) power to actuate the reader or writer, or from write current excitation. In addition, the point with minimum spacing to disk could be located away from either the reader or the writer, imposing further restrictions to achievable magnetic spacing during reading and writing. Improvements in PMR head design are needed to control the protrusion differences at the writer, the reader and the minimum point, and its variation. In particular, for the touchdown and then back off mode of operation using DFH, if the writer protrusion is much more than the reader protrusion, then the minimum reader spacing is determined by the excess protrusion plus any initial protrusion. The ratio of reader protrusion rate/writer protrusion rate is called the gamma ratio. A lower gamma ratio means the writer protrusion rate is much higher than the reader protrusion rate, and could potentially put a greater limit to achievable reader spacing.

While the ABS surface of the magnetic recording head protrudes at reader and writer positions during operation, the reader is being heated by the DFH. This is needed as thermal energy is the driving force to induce elastic deformation for enabling the reader to be at close proximity to the media for enhanced read back signal amplitude and signal-to-noise ratio (SNR). However, the reader is preferably kept at a cooler temperature due to a concern for high temperature noise (HTN) and instability issues. With TAMR recording as the post-PMR technology to push areal density even higher, the reader temperature rise budget becomes even tighter when including the heating associated with laser diode and waveguide operation. A novel recording head structure is desirable to reduce the reader temperature rise during operation while still enabling the reader to be near the touchdown location to minimize reader to media spacing. As a measure of Figure of Merit (FOM); the DFH induced reader heating can be quantified by the temperature rise in the reader per unit of actuation (nm) delivered by the DFH.

As the areal density requirement for magnetic recording becomes more stringent and dictates the performance of hard disk drives (HDD), magnetic spacing for both reader and writer is pushed close to the limit. The practice of energizing DFH to induce elastic protrusion of the ABS for touching down on the media has been improved significantly with the aid of fully integrated Head Disk Interference (HDI) and acoustic emission (AE) sensors. After determining the touch down of the head onto a disk, the DFH power is then reduced to enable the back off of the reader spacing at operation following the Wallace Spacing Equation. The back off amount has gradually diminished from generation to generation of devices and has now reached a sub-nanometer distance. Dynamic control of reader spacing involves a thin layer of heater film that is embedded inside the magnetic recording head, and usually within one or more insulation layers. The joule heating from the electrical current into the heater film is conducted away from the source to the entire slider body.

The Wallace Spacing Equation published by R. L. Wallace is in "The reproduction of magnetically recorded signals", Bell Syst. Techn. J., 30, 1145-73 (1951). A key point is that the read back amplitude from a single frequency pattern on a disk decays exponentially when the sensor to disk spacing is increased. The Wallace Spacing Equation is represented by $A=A0*\exp(-d*2\pi/l)$ where "l" is the period (in a unit length such as nm), A is the read back amplitude, and "d" is the spacing between the read head sensor and the disk when the sensor is designed such that the intrinsic spacing resolution is better than the recording pattern period.

A common way to increase the read gap (RG) actuation during DFH operation is to increase the lower read shield (S1) thickness. The increased volume of the S1 shield enables the RG to protrude more at the same power, thus improving the RG gamma parameter and dynamic performance (DP). The thickness of the upper read shield (S2A) is part of the contribution to reader-writer separation which is desired to be as small as possible in order to have high format efficiency in the drive. With the increased imbalance of the S1 and S2A shield thicknesses resulting from a thicker S1 shield, certain drawbacks in magnetic characteristics associated with the read shield thickness ratio create undesirable transfer curves for the reader. One drawback is an increased hysteresis reject rate during quasi-static (QST) testing. In addition, a thicker S1 shield reduces the QST amplitude for a fixed field span testing. This indirectly impacts QST based noise testing such as PAT (proportional amplitude testing). Although this issue can be addressed in principle by new testing conditions, significant investment would be required for appropriate tester upgrades. An alternative to a thicker S1 layer is desirable in order to improve RG actuation without adversely compromising other read head characteristics. Thus, an improved read head design is needed to enable further advances in magnetic recording technology. The read head structure is further required to be robust against wear from mechanical stress induced at touchdown calibration and potential HDI events during the HDD operation throughout its lifetime.

SUMMARY

One objective of the present disclosure is to provide a read head configuration that will enable a more efficient read gap (RG) actuation such that a larger RG protrusion is achieved at the same power level compared with prior art read head structures.

Another objective of the present disclosure is to provide a read head configuration according to the first objective that also provides improved protection of the sensor element during touchdown along the ABS for better reader reliability and a longer useful life.

According to one embodiment of the present disclosure, the aforementioned objectives are achieved with a read head that has a DFH heater element, hereafter referred to as DFH element, formed in a first insulation layer below the bottom (S1) shield. The DFH element is recessed from the ABS to an extent that direct heating of the reader (sensor) is minimized. A key feature is a non-magnetic two piece heat sink (HS) layer with a front piece that is recessed from the ABS by a distance of about 0.1 to 2 microns and a back piece that is separated from the front piece by a gap of at least 1 micron. The front piece has a top surface that adjoins a bottom surface of the S1 shield, and a bottom surface of which a portion thereof is aligned above a top surface of the DFH element, a front side that adjoins a front section of the S1 shield, and a back side formed adjacent to a second insulation layer. From a top view, the front HS piece has a rectangular shape with a cross-track dimension formed parallel to the ABS. The width of the front piece in a cross-track direction near the ABS is preferably slightly greater than the cross-track width of the S1 shield at the ABS to enable more uniform S1 shield topography and a uniform magnetic property. The front piece extends towards the back end of the reader and terminates below a back end of the S1 shield. The front piece has a substantially planar top surface except in a region that overlays the DFH element and is observed as a bump that rises above the remainder of the front piece.

The second HS piece known as the back piece preferably has the same thickness as the front piece and has a top surface formed in the same plane as the planar portion of the front piece top surface. In one aspect, the back piece has a first side that is formed along a plane that includes a first side of the front piece and is perpendicular to the ABS, and has a second side that is parallel to the first side wherein the second side is formed along a second plane that includes a second side of the front piece. In one embodiment, the back HS piece is aligned above a back portion of the DFH element that is not covered by the S1 shield. From a top view, the back HS piece has a rectangular shaped surface that may be equal to or greater in size than the top surface of the front HS piece, depending on the size of the DFH element and leads that supply current to the DFH element. In other words, the front HS piece is employed to assist with control of reader protrusion and serves as a heat sink while the back HS piece is used primarily to dissipate heat from the DFH element.

The two piece heat sink layer preferably has a higher CTE than the S1 shield. For example, the two part HS layer may be comprised of Cu or Zn when the S1 shield is made of permalloy. Because of the CTE differential between the S1 shield and HS layer, the bottom portion of the read head structure tends to protrude more than the upper portion above the S1 shield where the sensor is located. As a result, the HS layer serves to protect the sensor element at touchdown calibration and in real HDD operation to shelter the sensor element from directly contacting the media, thus improving reader robustness during HDI events. Furthermore, as a measure of the Figure of Merit (FoM), the DFH induced reader heating can be quantified by the temperature rise in the sensor per unit of actuation (nm) delivered by the DFH: We have found an improvement in the sensor temperature rise FoM with the dual HS piece design disclosed herein.

From a down track cross-sectional view along a plane that is perpendicular to the ABS, the S1 shield has a first thickness in a front section along the ABS, and a second thickness less than the first thickness in a second section that is formed above the front HS piece. The remainder of the read head structure is unchanged from a conventional design wherein a sensor element is formed in a gap layer between the S1 shield and a top shield.

The present disclosure also includes a method for forming the two piece HS layer in a read head structure. Once the first insulation layer is laid down on the substrate, the DFH element is sputter deposited or electroplated within an opening in a first photoresist layer formed on the first insulation layer. Thereafter, the first photoresist layer is removed and a second insulation layer is formed on the DFH element and on the first insulation layer. Next, a second photoresist layer is formed on the second insulation layer and front and back openings are formed therein above front and back sections, respectively, of the DFH element. The front HS piece is deposited in the front opening while the back HS piece is deposited in the back opening. Then the second photoresist layer is removed. A third photoresist layer is formed on the dual piece HS layer and on the second insulation layer. An opening is made above the front HS piece that extends to the eventual ABS plane. After the S1 shield is deposited, the third photoresist layer is removed and a third insulation layer is deposited and planarized by a chemical mechanical polish step. The remainder of the read head and overlying write head may be formed by conventional methods. In one embodiment, a cover layer comprised of SiC is formed in an overcoat layer at the top of the write head.

DETAILED DESCRIPTION

The present disclosure relates to a two piece heat sink (HS) layer that is formed in a read head on an opposite side of the S1 shield with respect to the sensor element, and is a method for making the same. The read head may be used in perpendicular magnetic recording (PMR) or in a thermal assisted magnetic recording (TAMR) device. The dual piece HS layer minimizes DFH induced reader temperature rise Figure of Merit, and advantageously provides larger protrusion for the S1 shield or bottom portion of the read head compared with the reader element (sensor) and upper portion of read head to protect the sensor from direct contact with the media during intentional touchdown calibration and HDI events. Although a read/write head is depicted with an overcoat layer and a SiC cover layer in the exemplary embodiments, the present disclosure encompasses other recording head configurations as appreciated by those skilled in the art. The drawings are provided by way of example and are not intended to limit the scope of the disclosure.

Figure 1:
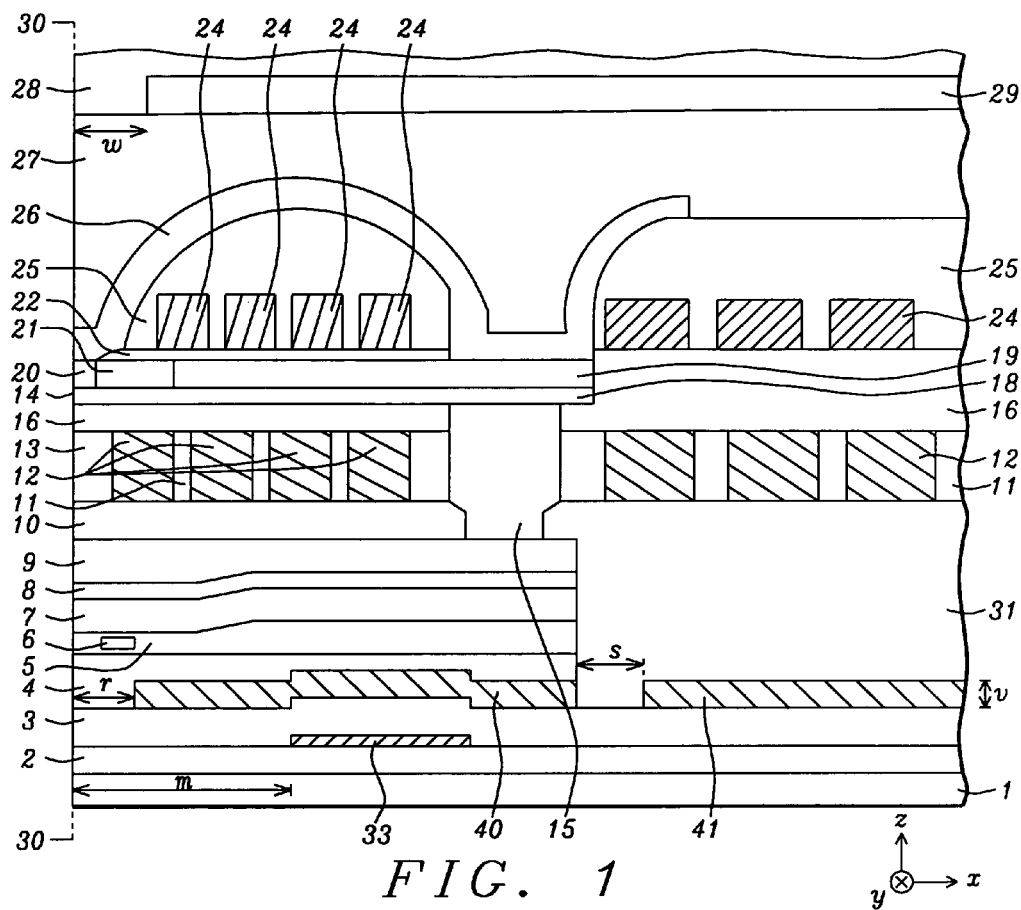
FIG. 1 is a cross-sectional view showing a read/write head with a dual piece heat sink layer including a front piece between a DFH element and a S1 shield according to one embodiment of the present disclosure.

Referring to FIG. 1, one embodiment of the present invention is depicted in a cross-sectional view of a combined read/write head from a plane orthogonal to an air bearing surface (ABS) 30-30. The z-axis represents a down-track direction, the y-axis is a cross-track direction, and the x-axis is perpendicular to the ABS and extends toward a back end of the recording device. The read/write head is formed on a substrate 1 that may be comprised of AlTiC (alumina+TiC). Those skilled in the art will recognize that layers 2-9, 31, 33, 40, and 41 represent the read head portion of a read/write head and layers 9-27 represent the write head portion. The substrate 1 is typically part of a slider (not shown) formed in an array of sliders on a wafer. After the read/write head is completed, the wafer is sliced to form rows of sliders. Each row is typically lapped to afford an ABS before dicing to fabricate individual sliders that are used in a magnetic recording device. Note that FIG. 1 is taken along a plane 52-52 in a top down view depicted in FIG. 4.

According to one preferred embodiment, a dynamic fly height heater element hereafter referred to as DFH element 33 with a thickness n is formed on the first insulation layer 2 that may be comprised of alumina or another dielectric material. There is a second insulation layer 3 formed on the DFH element so that the DFH element is separated from an overlying dual piece heat sink layer 40, 41. The DFH element has a top surface and sides that contact the second insulation layer. The DFH element 33 is a resistor and when power is applied through leads (not shown) from a power source, the resistor heats up the surrounding layers and causes thermal protrusion of the recording head layers to provide dynamic fly height (DFH) control. In other words, the amount of power supplied to the DFH element controls RG protrusion and typically affects write gap (WG) protrusion as well. Note that RG and WG protrusion may be tuned by the choice of metal or alloy selected for the DFH element since each resistor material has a particular thermal and mechanical response to a given electrical input. Preferably, the DFH element 33 is recessed a distance m of about 0.2 to 15 microns from the ABS 30-30 and extends in the x-axis direction (perpendicular to the ABS) by a distance of 5 to 100 microns. The DFH element is recessed a sufficient distance from the ABS to reduce direct heating of the sensor 6 that is formed within gap layer 5. As a result, there is some loss of protrusion of the S1 shield 4 and overlying layers in the recording head for a given amount of actuation power supplied to the DFH heater compared with a condition where the DFH element is placed closer to the ABS.

An important feature of the present disclosure is a dual piece heat sink (HS) layer formed on the second insulation layer wherein a front HS piece 40 and a back HS piece 41 are aligned above front and back portions, respectively, of the DFH element 33 as explained later with regard to FIG. 4. According to one embodiment, the front and back HS pieces are separated by a gap distance s of between 0.5 and 5 microns, and preferably at least 1 micron to enable a more reproducible gap dimension during the fabrication process. The gap is comprised of a third insulation layer 31 that may be alumina, for example.

Figure 2:
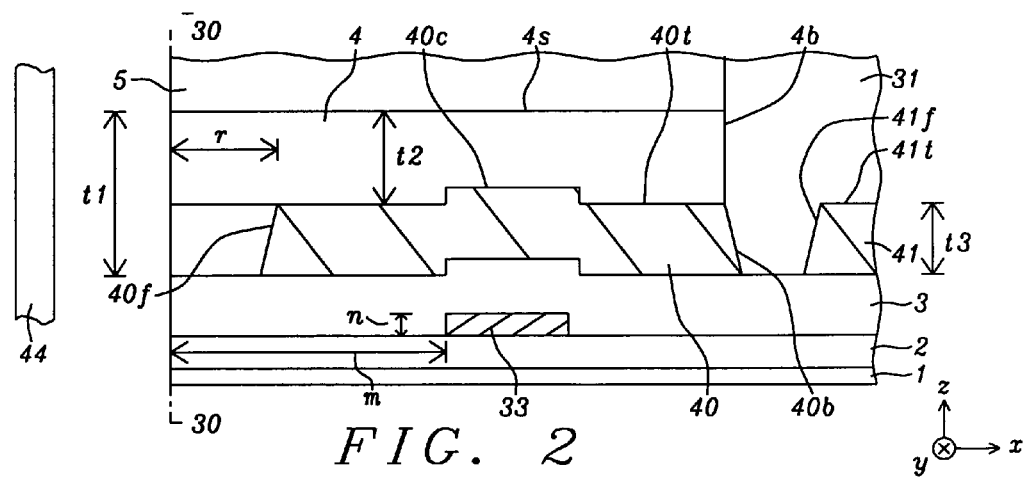
FIG. 2 is an enlarged cross-sectional view of a portion of the read head from FIG. 1 that includes the S1 shield and dual piece heat sink layer.

As depicted in FIG. 2, a top surface 40t of the front piece and a top surface 41t of the back piece are substantially coplanar, except for a portion of the front piece with top surface 40c that is aligned above the DFH element 33. Thus, the portion with top surface 40c represents a topographical feature that is observed as a bump. Preferably, front and back pieces 40, 41, respectively, have a thickness t3 in a down-track direction that is less than a thickness t1 of the S1 shield at the ABS. Although front side 40f and back side 40b of the front HS piece are shown as vertical in FIG. 1, in an alternative embodiment, sides 40f, 40b may be sloped or non-vertical as depicted in FIG. 2. Likewise, front side 41f and back side (not shown) of the back HS piece may be non-vertical. Note that sloped sides for the front HS piece mean that top surface 40t has a smaller length in an x-axis direction than a bottom surface that contacts insulation layer 3. Furthermore, we have found that a t1:t3 ratio from 1:1 to 8:1 provides the optimum benefits in terms of improved sensor reliability and better sensor temperature rise FoM. The dual piece HS layer has a high coefficient of thermal expansion (CTE) that is preferably greater than the CTE of the overlying S1 shield 4 and of dielectric material such as alumina in insulation layers 2, 3, and 31. In one aspect, the dual piece HS layer is comprised of Cu, a Cu alloy, Zn, or a Zn alloy, although other metals or alloys having a CTE greater than that of permalloy may be employed.

During heating provided by DFH element 33, front HS piece 40 is mainly responsible for expanding and effectively pushing the read head layers including S1 shield 4 and sensor 6 towards the magnetic medium 44 that is typically a few nanometers away from the ABS 30-30. The loss of protrusion caused by recessing the DFH heater from the ABS is compensated by expansion of the front HS piece 40. Typically, the DFH element extends farther from the ABS than a back end of the S1 shield as depicted in FIG. 4. Accordingly, the back HS piece 41 overlays a substantial region of a back portion of the DFH element and thereby prevents intense localized heating around the DFH element that might create an issue of electromigration of metal from the DFH element and thereby improves heater reliability and longevity.

Referring again to FIG. 2, it is important to recess a front end 40f of the front HS piece from the ABS 30-30 by a distance r of around 0.1 to 3 microns where m>r. Thus, the overlying S1 shield 4 which contacts and covers an entire top surface 40t of the front HS piece has a thickness t2 in a back section above front piece 40, and a thickness t1 that is larger than t2 along a front end S1 shield section that adjoins the ABS 30-30. Preferably, t1 is significantly larger than t3 such that a top surface of the S1 shield is substantially planar or has a gentle slope to avoid an abrupt topography change that could degrade the magnetic property of the S1 shield. In an embodiment (not shown) wherein the top surface 4s of the S1 shield has a gentle slope, a section of the top surface above topography feature 40c may be a greater distance from insulation layer 2 than other regions of the S1 shield top surface.

A front end section of S1 shield 4 is needed between the ABS and front piece 40 for good touchdown detection sensitivity if the S1 shield becomes the first point of contact. The CTE differential between the S1 shield and front piece mentioned earlier has a significant benefit that promotes a robust read head, and especially improves reliability of sensor 6. In particular, the bottom portion of the S1 shield 4 adjacent to the front HS piece tends to protrude slightly more during heating than overlying layers thereby acting as a "protection layer" for the sensor at touchdown calibration and in real HDD operation. Thus, the enhanced protrusion of the S1 shield, and especially a bottom portion thereof, compared with overlying layers prevents the sensor from directly contacting the media during HDI events.

Figure 3:
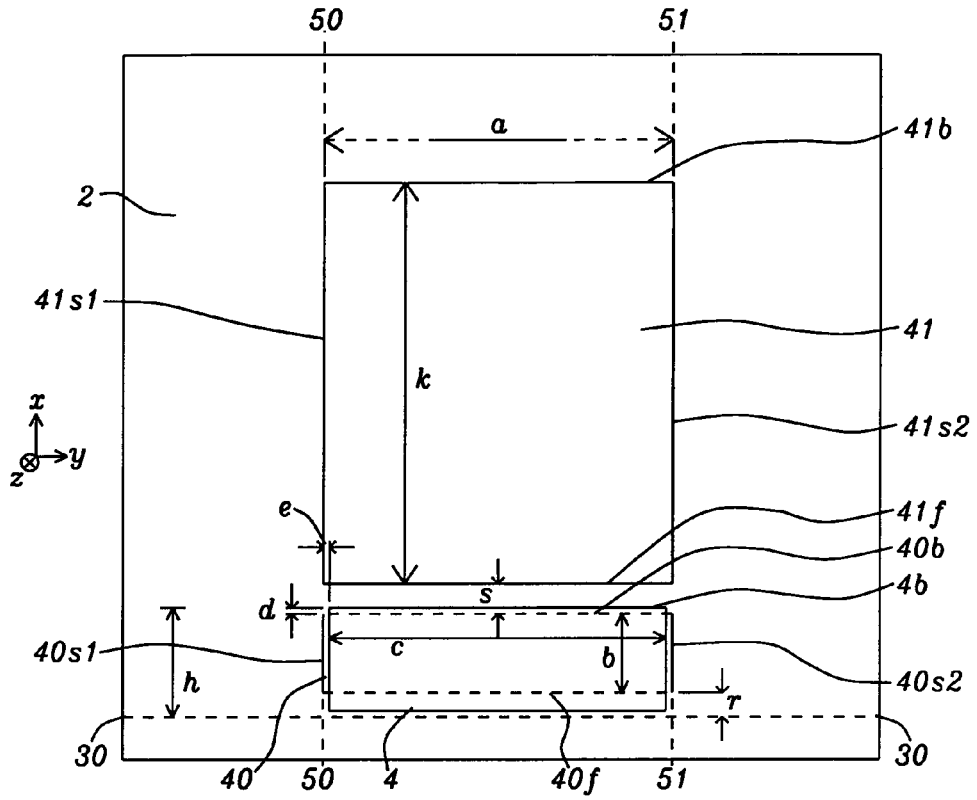
FIG. 3 is a top view of a dual piece heat sink (HS) layer with a S1 shield superimposed on the front HS piece according to an embodiment of the present disclosure.

Referring to FIG. 3, one embodiment of a dual piece HS layer according to the present disclosure is illustrated from a top down view where layers above the dual piece HS layer have been removed except for S1 shield 4. The front piece 40 has a first side 40s1 formed along a first plane 50-50 that is aligned perpendicular to the ABS 30-30, and there is a second side 40s2 formed parallel to side 40s1 along a second plane 51-51 wherein the first and second sides are separated by a distance a that represents the cross-track width of the front and back HS pieces. In the exemplary embodiment, front piece 40 has a rectangular shape with a front side 40f that is aligned parallel to the ABS. The front piece has a height b of 2 to 15 microns along sides 40s1, 40s2. A back end 4b of the S1 shield may be a slightly greater distance from the ABS than a back side 40b of the front piece. The distance d between back end 4b and back side 40b may vary from 0 to about 1 micron, for example. When d=0 as depicted in FIG. 1, the back side of front piece 40 and a back end of the S1 shield and overlying read head layers may terminate the same distance from the ABS. The cross track width c of the S1 shield is preferably less than a in order to balance the S1 shield topography (magnetic property) and thermal energy concentration toward a center position in a cross-track direction. In FIG. 3, the S1 shield has a width c=a−2e. Thus, the wider front piece 40 where a>c ensures a uniform topography of the overlying S1 permalloy layer, and also helps to diffuse thermal energy in a cross-track direction to reduce the sensor temperature rise FoM.

According to one embodiment, the back HS piece 41 of the dual HS layer also has a rectangular shape with a first side 41s1 formed along plane 50-50, a second side 41s2 along plane 51-51, a front side 41f aligned parallel to the ABS plane 30-30, and a back side 41b. The height f of the back piece is shown as greater than b but may be equal to or less than b depending on the size of the DFH element, the spacing s, and the shape of the DFH element as shown in FIG. 4.

Figure 4:
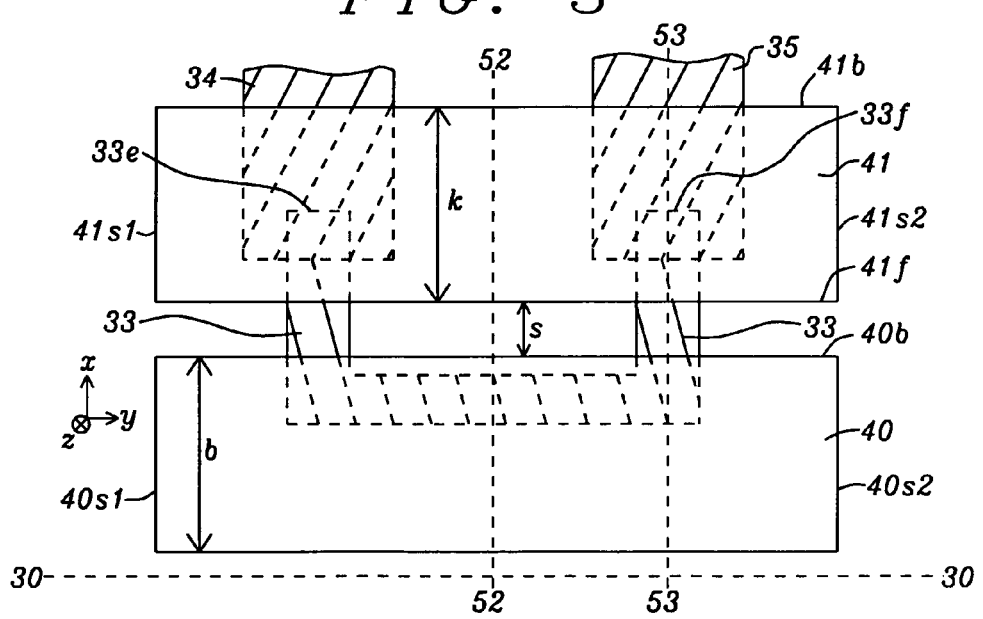
FIG. 4 is a top view of a front HS piece and a back HS piece that are overlaid on a DFH element and leads according to an embodiment of the present disclosure.

Referring to FIG. 4, a top-down view of the dual piece HS layer is shown with overlying layers removed. In this embodiment, front and back HS pieces 40, 41 have approximately equal size such that b~k, and preferably cover essentially the entire DFH element 33 except for a portion between the front and back HS pieces. The DFH element is depicted with a U shape wherein a middle section is formed below the front HS piece 40 and has a lengthwise dimension that is aligned along a y-axis direction. The two parallel sections of the U shaped DFH element are connected to opposite ends of the middle section and extend toward a back end of the device in a direction perpendicular to the ABS 30-30. It should be understood that alternative DFH designs may be employed such as a serpentine pattern or other layouts used in the art. One of the two parallel sections terminates at an end 33e that contacts an overlying lead 34, and the other of the two parallel sections terminates at end 33f which contacts an overlying lead 35. Note that ends 33e, 33f as well as the portions of leads 34, 35 that connect to the DFH are preferably located below the back HS piece 41. Thus, the dual piece HS layer covers a majority of the DFH element and prevents localized heating of the heater that could cause electromigration. Since the leads 34, 35 do not emit nearly as much heat as the DFH element, it is not necessary to extend the back HS piece above the full length of the leads.

Figure 5:
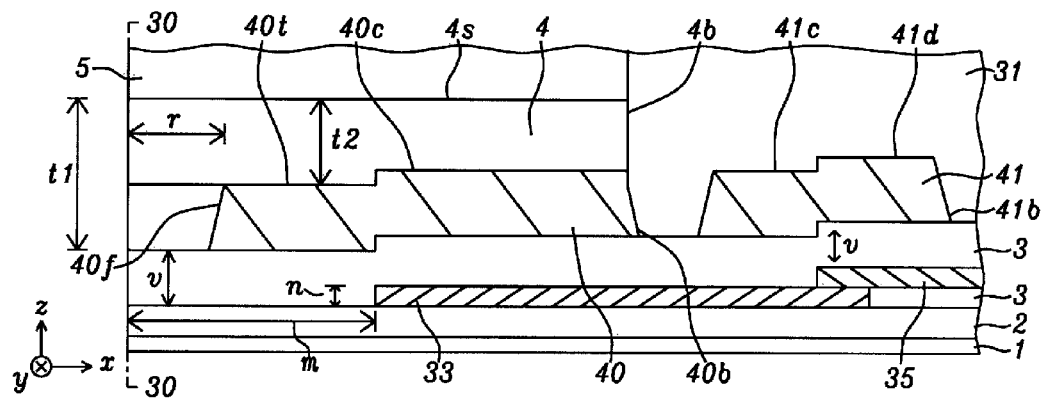
FIG. 5 is a cross-sectional view along a plane that is perpendicular to the ABS and intersects the front and back HS pieces, the DFH element, and leads depicted in FIG. 4.

Referring to FIG. 5, a cross-sectional view is depicted along the plane 53-53 in FIG. 4 and illustrates the topography generated by sequentially coating a DFH element 33, lead 35 (and 34), insulation layer 3, and front and back HS pieces 40, 41 on insulation layer 2. In particular, a topography feature with top surface 40c is formed on front HS piece 40 as described previously. The main portion of top surface 40t is planar except for the bump with top surface 40c aligned above DFH element 33. Similarly, a front section 41c of the top surface in the back piece 41 is above DFH element 33. As a result, front section 41c is a greater distance from substrate 1 than the main portion of top surface (41t in FIG. 2) in the back piece, and is essentially coplanar with top surface 40c. The back section 41d of the top surface in back piece 41 is formed above lead 35 and is even a greater distance from the substrate 1 than front section 41c. Since insulation layer 3 is generally a conformal coating, the thickness v is maintained throughout the insulation layer including a front end below the S1 shield 4 and in a back end above the lead 35.

Returning to FIG. 1, it should be understood that a second resistive heater (not shown) may be positioned in the read/write head at a location such as in insulation layer 10 between the S2B shield 9 and the bucking coil layer 12 to further tune WG and RG protrusion.

The S1 shield 4 may be comprised of NiFe or CoFeNi, for example. A read gap 5 is formed between the S1 shield 4 and S2A shield 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an anti-parallel fashion. The non-magnetic layer in the sensor 6 may be comprised of Cu in a giant magnetoresistive (GMR) sensor, or may be an insulator such as alumina or MgO in a tunneling magnetoresistive (TMR) sensor.

A first top shield (S2A) layer 7, insulation layer 8, and second top shield (S2B) layer 9 are formed sequentially on the read gap 5. Top shield layers 7, 9 may be made of the same magnetic material as in the S1 shield 4, and insulation layer 8 may be the same dielectric material as in insulation layer 2. Note that the S2B layer 9 may serve as a flux return pole in the write head portion of the read/write head.

The present disclosure anticipates that various configurations of a write head may be employed with the read head portion. In the exemplary embodiment, there is a first section of an insulation layer 10 formed on the S2B shield layer 9 and between the ABS 30-30 and a back gap connection 15. A bucking coil layer 12 is disposed on the insulation layer 10 and is shown with a plurality of turns between the back gap connection 15 and ABS 30-30 that are separated from each other by an insulation layer 11 comprised of a photoresist material. The portion of bucking coil layer 12 closest to the ABS 30-30 is coplanar with an insulation layer 13 that is formed along the ABS. The top surfaces of insulation layers 11, 13 and bucking coil layer 12 are coplanar in this embodiment. Insulation layers 10, 11, 13 are comprised of a dielectric layer and bucking coil layer is typically a conductive material such as Cu. The back gap connection 15 may be made of CoFeNi or the like and magnetically couples the main pole layer 18 to the S2B shield layer 9 that serves as a flux return pole. In an alternative embodiment, the back gap connection may be omitted.

An insulation layer 16 is formed on insulation layers 11, 13 and on bucking coil layer 12 and a first section extends from the ABS 30-30 to the back gap connection 15. Both of the insulation layers 11, 16 have a second section on the opposite side of the back gap connection 15 with respect to the ABS. Above the insulation layer 16 is a main pole layer 18 that may be comprised of CoFeNi or another magnetic material. Main pole layer 18 has a pole tip 14 at the ABS 30-30 and extends toward the back end of the device with a sufficient length to connect with back gap connection 15. A first write shield layer 20 is disposed on the main pole layer 18 at the ABS and extends a throat height distance (not shown) away from the ABS 30-30 to connect with a non-magnetic layer 21. The first write shield layer 20 may be made of CoFeN, CoFeNi, NiFe, or CoFe, for example, and is coplanar with the non-magnetic layer 21 and a yoke 19 which is formed on the main pole layer 18 and serves to concentrate magnetic flux at the write pole tip 14. There is an insulation layer 22 formed on a portion of the non-magnetic layer 21 and yoke 19. Magnetic flux in the yoke 19 is generated by passing a current through the main coil layer 24 that is disposed on the insulation layer 22. The main coil layer 24 has a plurality of turns but only four turns are depicted in the drawing.

There is a second shield layer 26 formed on the first shield layer 21 along the ABS and which arches over the main coil layer 24 and connects with the top surface of the yoke 19 in a region overlying the back gap connection 15. An insulation layer 25 is formed on the insulation layer 22 and fills the openings between the turns of the main coil layer 24 and the space between the main coil layer and the arched second shield layer 26. A protection layer 27 covers the second shield layer 26 and is made of an insulating material such as alumina. Above the protection layer 27 and recessed a certain distance from the ABS 30-30 is a cover layer 29 that is preferably comprised of a low CTE material such as SiC and serves to reduce the WG protrusion rate. The SiC cover layer 29 is recessed to avoid introducing a material at the ABS with different mechanical and etch resistance properties than adjacent layers which could adversely affect back end lapping and ion beam etching processes. An overcoat layer 28 is formed between the SiC cover layer 29 and ABS 30-30 and on the top surface of the SiC layer.

Figure 6:
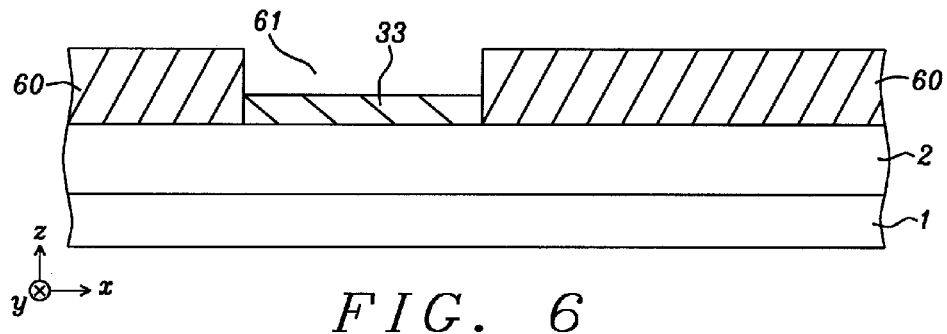
FIG. 6 is a cross-sectional view showing a DFH element formed within a first photoresist pattern according to a fabrication method of the present disclosure.

Referring to FIG. 6-9, a sequence of steps is provided that represents a method of forming a dual piece heat sink layer between a DFH element and a S1 shield according to the present disclosure. The cross-sectional views in FIGS. 6-9 are along a plane 52-52 shown in the finished structure in FIG. 4. In FIG. 6, a first insulation layer 2 is deposited on substrate 1 by a sputter deposition method or the like. Thereafter, a first photoresist layer 60 is coated on insulation layer 2 and patterned to form an opening 61 in the photoresist layer that corresponds to the desired shape and size of the DFH element to be formed in a subsequent step. Next, the DFH element 33 is sputter deposited or plated into the opening 61.

Figure 7:
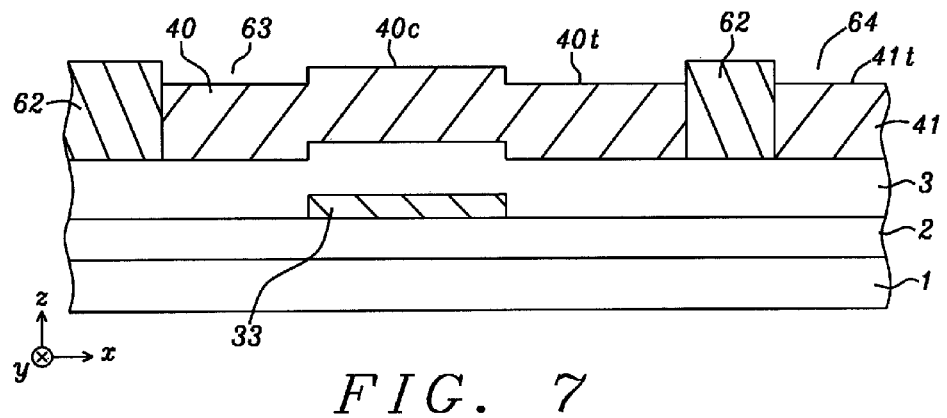
FIG. 7 is a cross-sectional view showing a front HS piece and back HS piece formed in openings within a second photoresist layer according to a fabrication method of the present disclosure.

Referring to FIG. 7, the first photoresist layer is stripped by a conventional process and then a second insulation layer 3 is deposited on the DFH element 33 and on the first insulation layer 2. Typically, the second insulation layer is a conformal coating such that topography (bump) is formed on a top surface of insulation layer above the DFH element. Then a second photoresist layer 62 is coated on insulation layer 3 and patterned to form openings 63, 64 that correspond to the desired shape and size of the subsequently deposited front and back HS pieces 40, 41, respectively. The front and back HS pieces may be deposited in the openings 63, 64 by an electroplating process or by a sputter deposition process, for example. The present disclosure encompasses an embodiment wherein a diffusion barrier layer and a seed layer (not shown) may be sequentially formed in the openings 63, 64 before depositing Cu, Zn, or alloys thereof to form front and back HS pieces 40, 41, respectively. There is topography (bump with top surface 40c) formed on a top surface of the front HS piece above the DFH element. Surrounding regions of top surface 40t, and top surface 41t are substantially planar.

Figure 8:
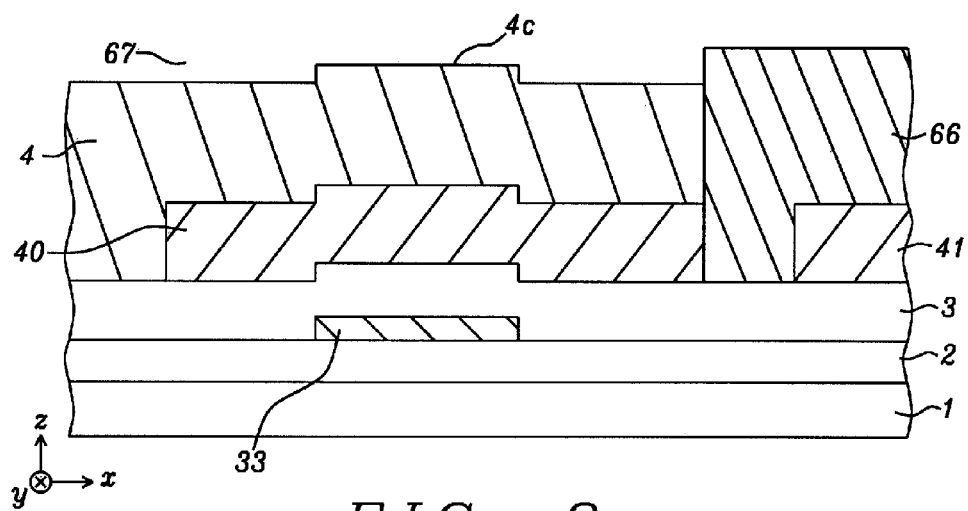
FIG. 8 is a cross-sectional view depicting a S1 shield formed above the front HS piece in FIG. 6 according to a fabrication method of the present disclosure.

Referring to FIG. 8, the second photoresist layer is removed and a third photoresist layer 66 is coated and patterned on front and back HS pieces 40, 41, and on insulation layer 3. An opening 67 in the photoresist layer is formed above the front HS piece, and between the front HS piece and eventual ABS plane at the extreme left side of the drawing. A seed layer (not shown) may be sputter deposited to cover exposed top surfaces of insulation layer 3 and front HS piece 40. Thereafter, the S1 shield 4 is electroplated in the opening. Depending on the thickness of the S1 shield in the down track direction, there may be topography 4c on the S1 shield top surface above the DFH element 33.

Figure 9:
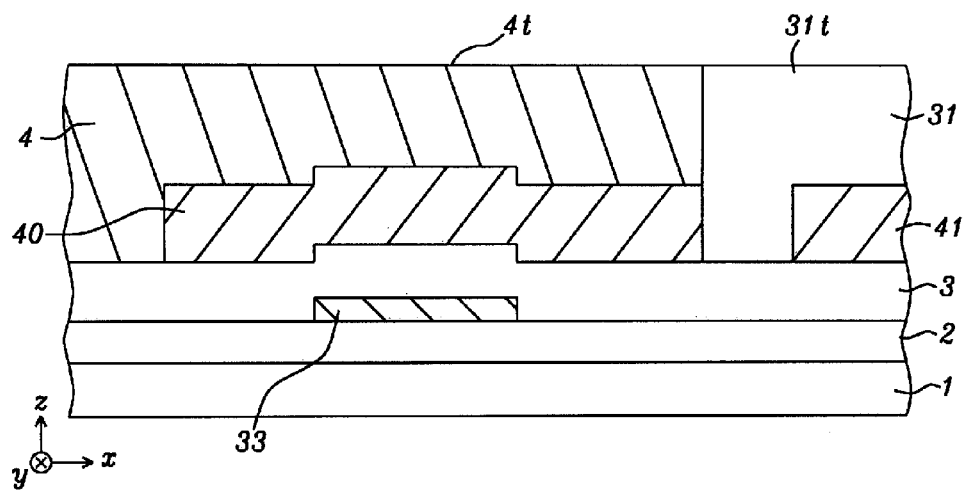
FIG. 9 is a cross-sectional view after the third photoresist pattern in FIG. 8 is removed, and an insulation layer is deposited and planarized according to a fabrication method of the present disclosure.

Referring to FIG. 9, the third photoresist layer is stripped by a conventional method followed by deposition of insulation layer 31 that is made of alumina or the like. In the following step, a chemical mechanical polish step is employed as a planarization technique to form a S1 shield top surface 4t and third insulation layer top surface 31t that are essentially coplanar. The remaining layers 5-29 in the read/write head are formed by well known methods that are not described herein. Thereafter, the read/write head is lapped such that the DFH element 33 is recessed a distance m, and front HS piece 40 is recessed a distance r from the resulting ABS 30-30 as shown in FIG. 1.

We have demonstrated that the dual piece heat sink layer design as disclosed herein enables better protrusion control of the read head with improved sensor reliability. In one example, a read head structure was fabricated in which the front and back HS pieces 40, 41 are made of Cu, the front HS piece is recessed a distance r of 2.5 microns from the ABS 30-30, and has a depth b of 10.8 microns as depicted in FIG. 3. Meanwhile, the overlying S1 shield 4 abuts the ABS on a front side and extends a distance h of 14 microns in a direction perpendicular to the ABS. The cross track width a of the front and back HS pieces 40, 41 is 40 microns and the cross track width c of the S1 shield is 38 microns. Thus, the front HS piece has sides 40s1, 40s2 that each extend a distance e of 1 micron in a cross track direction beyond the sides of the S1 shield. In this example, a back side 4b of the S1 shield extends a distance d of 1 micron beyond a back side 40b of the front HS piece. The gap distance between back side 40b and the front side 41f of the back HS piece is 4 microns, and the depth k of the back HS piece is 15 microns. We found that the protrusion at the bottom of the S1 shield during a normal DFH operation of increasing the temperature of adjacent regions by 50° C. is 8.6 nm compared with an 8.4 nm protrusion at the top of the S1 shield and for the reader element (sensor). The extra 0.2 nm protrusion at the bottom of the S1 shield is advantageously used to ensure the reader element is "tucked in" behind the S1 shield bottom and thereby avoid direct contact with the magnetic media. As a result, the reader element is protected from damage which leads to better reliability and longer life. It should also be understood that the design of the dual piece HS layer may be modified to optimize the control of heat flow to the adjoining write head and thereby enable optimum protrusion profile including the touchdown location.

We have also found an improvement in the Figure of Merit (FoM) for the DFH induced reader heating with the dual piece HS design disclosed herein. In other words, the temperature rise in the read head sensor per unit of actuation (nm) delivered by the DFH is less than in the prior art.

While the present disclosure has been particularly shown and described with reference to, the preferred embodiment thereof, it will be understood by those skilled in the art that various changes in form and details may be made without departing from the spirit and scope of this disclosure.

We claim:

1. A read head structure; comprising:
   (a) a dynamic fly height (DFH) element formed on a substrate, the DFH element is recessed a first distance (d1) from an air bearing surface (ABS) and has a top surface and sides that contact a first insulation layer, the DFH element expands when heated and pushes the read head structure toward a magnetic medium that is proximate to the ABS;
   (b) a dual piece heat sink (HS) layer including a front piece and a back piece each having a top surface substantially formed in a first plane, the front piece is recessed a second distance (d2) from the ABS where d2<d1, and is aligned above a front portion of the DFH heater element while the back piece is aligned above a back portion of the DFH heater element, a front side of the back piece that faces the ABS is separated from a back side of the front piece by a gap that is filled with a second insulation layer; and
   (c) a bottom (S1) shield formed on a portion of the first insulation layer and that contacts the top surface of the front piece, the S1 shield has a front side along the ABS and a first thickness (t1) in a down-track direction in a front section adjoining the ABS, and a second thickness (t2) in the down-track direction in a back section formed over the front piece where t1>t2.

2. The read head structure of claim 1 wherein the dual piece HS layer has a coefficient of thermal expansion (CTE) that is greater than a CTE of the S1 shield.

3. The read head structure of claim 1 wherein the dual piece HS layer is comprised of Cu, a Cu alloy, Zn, or a Zn alloy.

4. The read head structure of claim 1 wherein each of the front piece and back piece have a rectangular shape from a down-track view with a first side formed along a second plane that is perpendicular to the ABS, a second side that is aligned parallel to the first side and is formed along a third plane, and a front side that is aligned parallel to the ABS.

5. The read head structure of claim 1 wherein the front piece has a greater cross-track width than a cross-track width of the S1 shield.

6. The read head structure of claim 1 wherein the second distance (d2) is from about 0.1 to 3 microns.

7. The read head structure of claim 1 wherein a gap distance between the back side of the front piece and the front side of the back piece is about 0.5 to 5 microns.

8. The read head structure of claim 1 wherein the dual piece heat sink layer has a third thickness (t3) in the down-track direction wherein a ratio of t1:t3 is from about 1:1 to 8:1.

9. The read head structure of claim 4 wherein the front side and the back side of the front piece are separated by a distance of about 2 to 15 microns.

10. A combined read head/write head structure; comprising:
    (a) a dynamic fly height (DFH) element formed on a first insulation layer, the DFH element is recessed a first distance from an air bearing surface (ABS) and has a top surface and sides that contact a second insulation layer, the DFH element expands when heated and controls a read gap (RG) and a write gap (WG) protrusion towards a magnetic medium;
    (b) a dual piece heat sink (HS) layer including a front piece and a back piece each having a top surface substantially formed in a first plane, the front piece is recessed a second distance from the ABS and is aligned above a front portion of the DFH heater element while the back piece is aligned above a back portion of the DFH heater element, a front side of the back piece that faces the ABS is separated from a back side of the front piece by a gap that is filled with a third insulation layer;
    (c) a bottom (S1) shield formed on a portion of the second insulation layer and that contacts the top surface of the front piece, the S1 shield has a front end along the ABS and a first thickness (t1) in a down-track direction in a front end section adjoining the ABS and a second thickness (t2) in the down-track direction in a back section formed over the front piece where t1>t2;
    (d) a sensor element formed in a gap layer, the sensor element adjoins the ABS and the gap layer separates the S1 shield from an overlying second shield; and
    (e) a third shield formed above the second shield wherein the third shield is an uppermost layer in the read head and is a bottom layer in the write head.

11. The combined read head/write head structure of claim 10 wherein the dual piece HS layer has a coefficient of thermal expansion (CTE) that is greater than a CTE of the S1 shield.

12. The combined read head/write head structure of claim 9 wherein the dual piece HS layer is comprised of Cu, a Cu alloy, Zn, or a Zn alloy.

13. The combined read head/write head structure of claim 10 wherein each of the front piece and back piece have a rectangular shape with a first side formed along a second plane that is perpendicular to the ABS, a second side that is aligned parallel to the first side and is formed along a third plane, and a front side that is formed parallel to the ABS.

14. The combined read head/write head structure of claim 10 wherein the front piece has a greater cross-track width than a cross-track width of the S1 shield.

15. The combined read head/write head structure of claim 10 wherein the first distance is from about 0.5 to 15 microns and the second distance is from about 0.1 to 3 microns.

16. The combined read head/write head structure of claim 10 wherein a gap distance between the back side of the front piece and the front side of the back piece is about 0.5 to 5 microns.

17. The combined read head/write head structure of claim 10 wherein the dual piece heat sink layer has a third thickness (t3) in the down-track direction wherein a ratio of t1:t3 is from about 1:1 to 8:1.

18. The combined read/write head structure of claim 13 wherein the front side and the back side of the front piece are separated by a distance of about 2 to 15 microns.

19. A method of forming a read head structure, comprising:
(a) forming a DFH element on a substrate, the DFH element has a top surface and side surfaces that contact a first insulation layer, and expands when heated to push the read head structure toward a magnetic medium;
(b) depositing the first insulation layer on the DFH element and on the substrate, the first insulation layer has a substantially planar top surface;
(c) forming a dual piece heat sink (HS) layer on the first insulation layer, the dual piece HS layer has a front piece and a back piece each having a substantially planar top surface formed in a first plane, the front piece is aligned above a front portion of the DFH element while the back piece is aligned above a back portion of the DFH element, a front side of the back piece that faces a back side of the front piece is separated from the front piece by a gap;
(d) depositing a second insulation layer on the dual piece HS layer and on the first insulation layer that fills the gap between the front piece and back piece;
(e) forming a first (S1) shield on a portion of the second insulation layer, the S1 shield contacts the top surface of the front piece, and extends from a plane that is proximate and parallel to the front side of the front piece to an end that is proximate to the back side of the front piece; and
(f) lapping the read head structure to form an air bearing surface (ABS) such that the S1 shield abuts the ABS, the DFH heater element is recessed a first distance from the ABS, and the front piece is recessed a second distance from the ABS wherein the second distance is less than the first distance.

20. The method of claim 19 further comprising forming a stack of layers on said S1 shield prior to the lapping process, including:
(a) a gap layer on the S1 shield and having a sensor element formed therein, the sensor element adjoins the ABS;
(b) a first upper (S2A) shield formed on the gap layer;
(c) a second insulation layer formed on the S2A shield; and
(d) a second upper (S2B) shield on the second insulation layer.

21. The method of claim 19 wherein the dual piece HS layer has a coefficient of thermal expansion (CTE) that is greater than a CTE of the S1 shield.

22. The method of claim 19 wherein the dual piece HS layer is comprised of Cu, a Cu alloy, Zn, or a Zn alloy.

23. The method of claim 19 wherein each of the front piece and back piece have a rectangular shape with a first side formed along a second plane that is perpendicular to the ABS, a second side that is aligned parallel to the first side and is formed along a third plane, and a front side formed parallel to the ABS.

24. The method of claim 19 wherein the front piece has a greater cross-track width than a cross-track width of the S1 shield.

25. The method of claim 19 wherein the first distance is from about 0.5 to 15 microns and the second distance is from about 0.1 to 3 microns.

26. The method of claim 19 wherein a gap distance between the back side of the front piece and the front side of the back piece is about 0.5 to 5 microns.

27. The method of claim 19 wherein the dual piece heat sink layer has a third thickness (t3) in a down-track direction wherein a ratio of t1:t3 is from about 1:1 to 8:1.

28. The method of claim 23 wherein the front side and back side of the front piece are separated by a distance of about 0.5 to 5 microns.

* * * * *